US006968358B2

(12) United States Patent
Freimuth et al.

(10) Patent No.: US 6,968,358 B2
(45) Date of Patent: Nov. 22, 2005

(54) METHOD AND APPARATUS FOR NETWORK COMMUNICATION CARD MEMORY MANAGEMENT

(75) Inventors: Douglas Freimuth, New York, NY (US); Roland Mraz, South Salem, NY (US); Erich M. Nahum, New York, NY (US); Prashant Pradhan, New Rochelle, NY (US); Sambit Sahu, Mahopac, NY (US); John Michael Tracey, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 10/205,024

(22) Filed: Jul. 25, 2002

(65) Prior Publication Data

US 2004/0019652 A1    Jan. 29, 2004

(51) Int. Cl.[7] .......................... G06F 15/16; G06F 12/00
(52) U.S. Cl. ...................... 709/203; 709/250; 711/118; 711/133; 711/144
(58) Field of Search ............................. 709/203, 250; 711/118, 133, 144

(56) References Cited

U.S. PATENT DOCUMENTS 6,807,581 B1 * 10/2004 Starr et al. .................. 709/250

OTHER PUBLICATIONS

Kim et al., "Increasing Web Server Throughput with Network Interface Data Caching", Computer Systems Laboratory, Rice University, Houston, Texas, Jul. 17, 2001, pp. 1-12.

* cited by examiner

Primary Examiner—Reginald G. Bragdon
(74) Attorney, Agent, or Firm—Duke W. Yee; Rafael Perez-Pineiro; Theodore D. Fay, III (57) ABSTRACT

A method, apparatus, and computer instructions for transferring data objects. A request for a data object is received at a communication adapter. A determination is made as to whether the data object is stored in a memory in the communication adapter in response to receiving the request. The data object is transferred from the memory to a receiver of the data object through the communication adapter in which transfer of the data across a bus connecting the communication adapter to the data processing system is unnecessary in response to the data object being present in the memory.

22 Claims, 5 Drawing Sheets

METHOD AND APPARATUS FOR NETWORK COMMUNICATION CARD MEMORY MANAGEMENT

BACKGROUND OF THE INVENTION

1. Technical Field

The present invention relates generally to an improved data processing system, and in particular, to a method and apparatus for processing data. Still more particularly, the present invention provides a method and apparatus for managing the transfer of data to a receiver from a server.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the Transmission Control Protocol/Internet Protocol (TCP/IP) suite of protocols.

The Internet has become a cultural fixture as a source of both information and entertainment. Many businesses are creating Internet sites as an integral part of their marketing efforts, informing consumers of the products or services offered or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

With respect to commerce on the Web, individual consumers and business use the Web to purchase various goods and services. In offering goods and services, some companies offer goods and services solely on the Web while others use the Web to extend their reach. In providing services and information, businesses and other organizations set up Web sites on servers to process requests from different users. These servers are connected to high speed networks. High-speed interfaces have become ubiquitous in server systems in the form of gigabit Ethernet, especially lately due to the introduction of copper-based gigabit adapters. In the near future, Ethernet speeds of 10 gigabits and even 40 gigabits will place even higher loads on servers. Shrinking chip prices and increasing central processing unit (CPU) speeds and functionality enable increasing amounts of intelligence to be placed on server network adapters. To support this intelligence, a certain amount of state must be maintained on the communication card to support the communication protocol. This state includes an area to buffer data while waiting for acknowledgments in reliable protocols such as TCP/IP, SNA, DECNET, and IPX. Given that the speeds of these future connection cards can exceed 10 gigabits per second and the time that data needs to be retained is a function of the round-trip acknowledgment time as well as the time-out delay for such reliable protocols, several gigabytes of memory may be required to support such a device in both host and communication card memory. Large amounts of memory and the logic associated with accessing the memory can add significant cost to a network communication card that is competing in a commodity environment. Additionally, the I/O bus between the host and network communication adapter must maintain this traffic as well as any control and header information to support this transfer or overall bandwidth will suffer.

Currently, when a server receives numerous requests, the resources of the server may be taxed causing a slow down in response time to users. For example, to transmit a data buffer in current generation, high-bandwidth communication adapter cards, the adapter is provided with a set of descriptors that include the physical system address and the length of data to be transferred. Some implementations may provide a base address on a well understood address boundary such as 4K and an offset. The data is then "held" in host memory until a protocol acknowledgment is received or a time-out period is exceeded and the data is resent.

In modern operating systems, the data is held in a "virtual copy" structure where a reference count keeps track of the number of instances that this buffer represents. The communication adapter transfers data to be transmitted from host memory to memory in the adapter staging the data for transfer onto the high-bandwidth network. With a reliable protocol such as TCP, data is considered acknowledged and the reference count is decremented. When the reference count for the memory buffer is zero, the buffer can be reused.

Systems that serve static content, such as file and Web servers, typically send popular content repeatedly. With conventional approaches to network transmission, each instance in which a given data item is sent is treated independently. In particular, if an item is sent five times, five copies of the item are required in the communication adapter's memory. Storing multiple copies of the same data in the memory of the communication adapter is inefficient and can be avoided given sufficient processing capabilities on the adapter. Thus, it would be advantageous to have an improved method, apparatus, and computer instructions for managing the transfer of data through a communication adapter.

SUMMARY OF THE INVENTION

The present invention provides a method, apparatus, and computer instructions for transferring data objects. A request for a data object is received at a communication adapter. A determination is made as to whether the data object is stored in a memory in the communication adapter in response to receiving the request. The data object is transferred from the memory to a receiver of the data object through the communication adapter in which transfer of the data across a bus connecting the communication adapter to the data processing system is unnecessary in response to the data object being present in the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
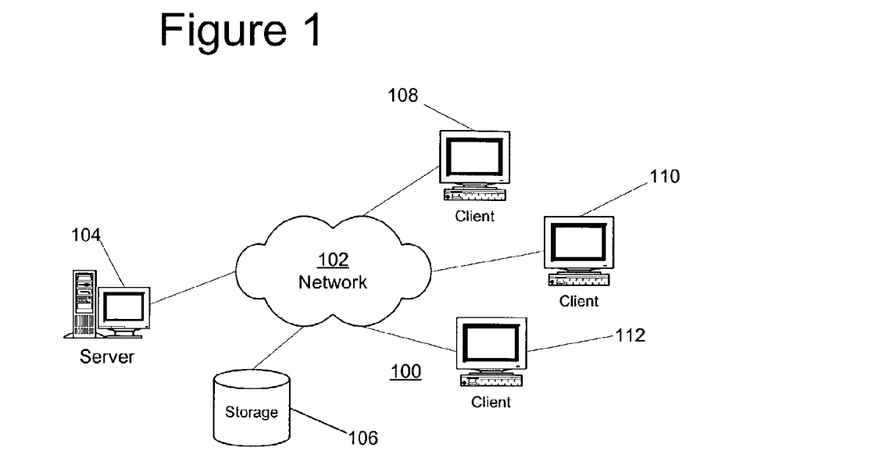
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The present invention includes a network communication card memory caching system that significantly reduces the memory requirements for high-bandwidth communication cards that support full or partial offload of protocol stacks such as TCP/IP. The method of the present invention may be implemented at the memory address buffer level which provides these advantages while being independent to the program application, operating system and/or file system used. Additionally, this method may provide fail over and redundancy capability for the communication protocol offload into the high speed communication adapter. In these examples, the processes used in caching and reusing objects are implemented on the communication adapter.

Figure 2:
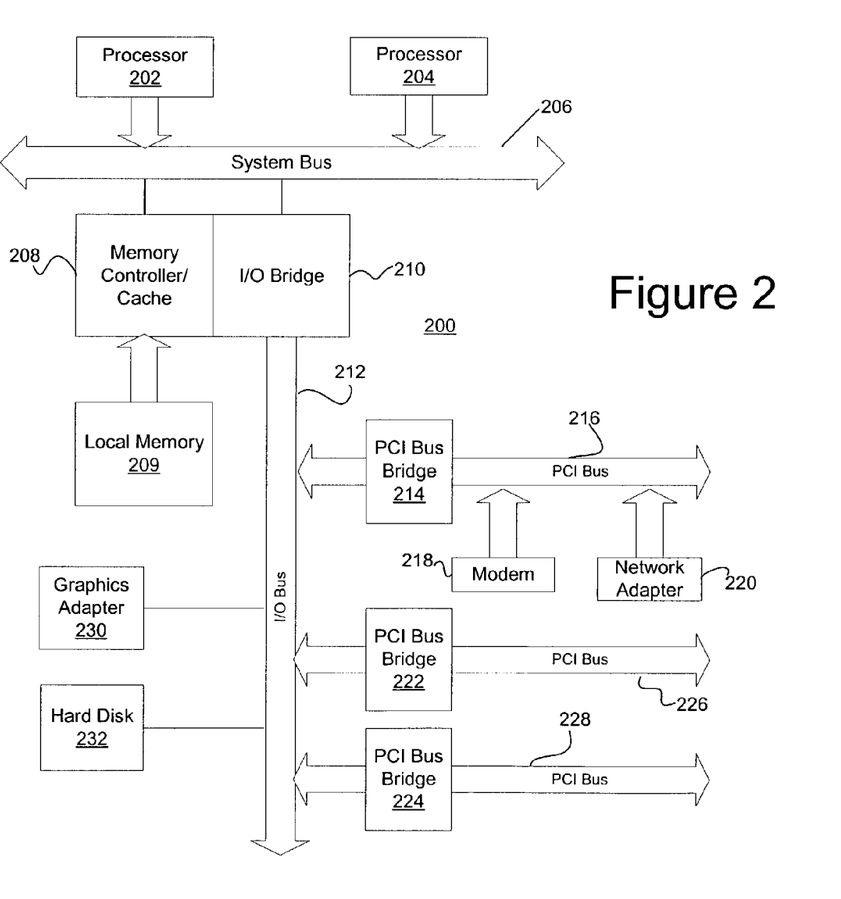
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system. In particular, the mechanism of the present invention may be implemented in a communication adapter, such as network adapter 220. Currently, network adapter 220 will receive a descriptor describing data to be transferred through network adapter 220. The data is transferred from storage, such as local memory 209 or hard disk 232, across busses, such as system bus 206, I/O bus 212, and PCI local bus 216 in data processing system 200 to buffers in network adapter 220. A check sum is generated for the data, and the data is then sent to a destination. The data is held in memory located in network adapter 220 until a protocol acknowledgment is received from the target. This protocol acknowledgment is an acknowledgment of the receipt of the data by the target. At that time, the data buffer in the memory is released and the data is cleared for reuse of the memory.

The mechanism of the present invention adds additional data transfer operations to network adapter 220. The mechanism of the present invention allows for caching of data objects used in network communications for reuse in repeated transmissions of the data objects. Synchronization and versioning identifiers are associated with these data objects in the depicted example. These identifiers allow concurrent and sequential use of data through processes executed on network adapter 220 in these examples. Network adapter 220 is provided with a descriptor describing data to be transferred. Instead of transferring data across busses in data processing system 200, a check or determination is made to see whether the data is present in memory in network adapter 220. This memory is also referred to as "offload memory". If the data is present in data buffers in the offload memory, the synchronization field is updated for use. This synchronization field is used to track multiple uses of data in the host memory and the adapter memory. This field often provides an identification of the number of instances a buffer represents data in the host memory and the number of times the buffer is referenced by the communication adapter. When the reference count is decremented to zero, the buffer may then be reused.

If the data is absent from the offload memory, the data is then pulled across the busses to network adapter 220. The data is then sent to the target. The data is held waiting for a protocol acknowledgment from the target of the data transfer. After the protocol acknowledgment is received, the data buffer may be released by updating the synchronization field. The data responsive to the transfer may be selectively held in the offload memory for future transfers. In this manner, data may be intelligently held in the data buffers on network adapter 220 and may be referenced in a manner to host memory, such that any repeated requests may result in the reuse of the data stored in these data buffers in the offload memory.

The mechanism of the present invention is especially useful for many types of servers, such as static content servers and Web content cache proxy servers. Other areas of use include broadcast and multicast applications. This mechanism also may be implemented in servers, such as network file system (NFS) file servers and server message block (SMB) file servers. The illustration of data processing system 200 is provided for purposes of illustration and is not meant to be a limitation to the manner in which the mechanism of the present invention may be implemented.

Figure 3:
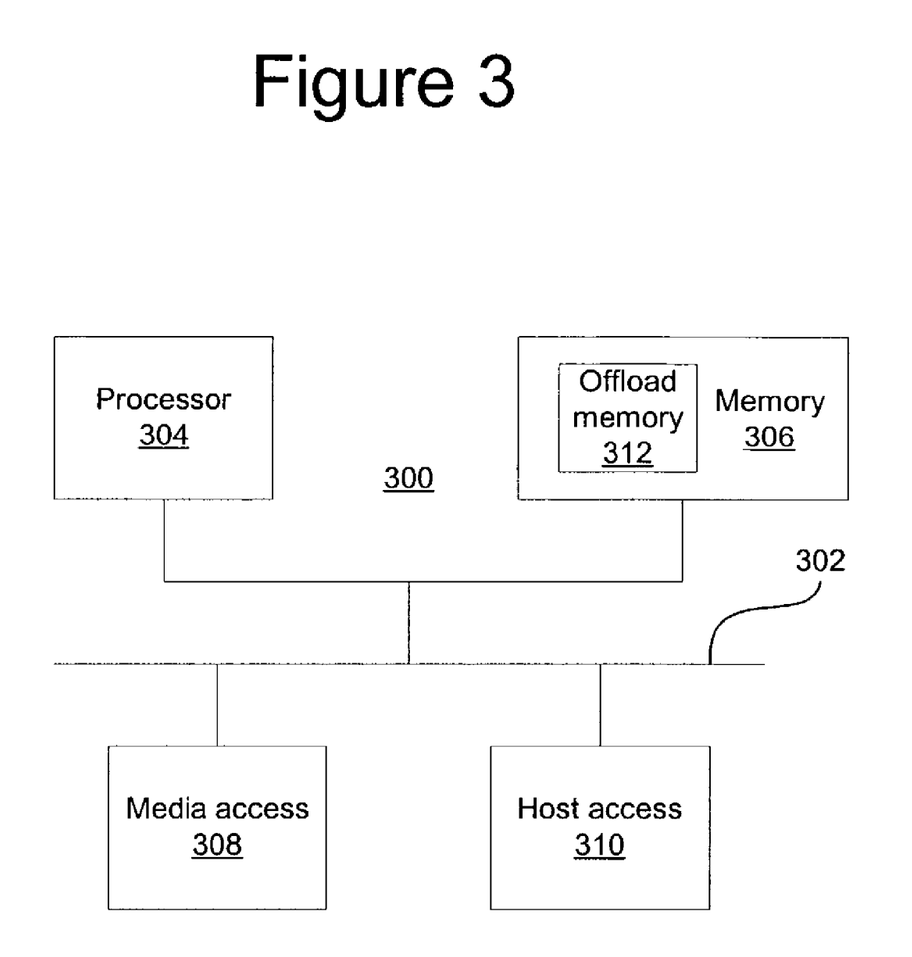
FIG. 3 is a block diagram illustrating a communication adapter in accordance with a preferred embodiment of the present invention.

Turning now to FIG. 3, a block diagram illustrating a communication adapter is depicted in accordance with a preferred embodiment of the present invention. Communication adapter 300 may be implemented as network adapter 220 in FIG. 2. Bus system 302 interconnects and provides communication between processor 304, memory 306, media access 308, and host access 310. Media access 308 provides a physical connection to the transport media, which may be, for example, the Internet, a local area network, or a wide area network. Processor 304 provides for execution of instructions used in transferring data and receiving requests and acknowledgments. Host access 310 provides a connection to a bus on the host.

In this example, memory 306 includes a section of memory for managing data transfer. This section of memory is offload memory 312. Buffers are present within offload memory 312, which are used for transferring data to a target. The data being transferred to a target may be obtained from a host through host access 310. Data received in offload memory 312 may be retained for future transfers. When a data descriptor describing a data object to be transferred to a target is received, a check is made as to whether the data object is present in offload memory 312. If the data object is present in offload memory 312, the data object is transferred to the target without requiring data transfers through host access 310. If the data object is absent, then the data object is transferred from the host side to offload memory 312.

In these examples, communication adapter 300 is assumed to have the capability for full or partial network protocol processing offload capability. This then requires data to be pulled from host memory without the pre-pended personality of the protocol headers for transfer. These headers can be constructed by the offloaded protocol engine, executed by processor 304, given connection state parameters provided by connection initialization. Connection state parameters may be stored in memory 306 and replicated in a local memory on the host side, such as local memory 209, in FIG. 2, for fail over features. In these examples, connection establishment and termination are functions performed via the control interface to the offload adapter. In determining the size or amount of state required to maintain all TCP connections on communication adapter 300, three parameters are used: the size of the connection state, the rate at which connections arrive, and the expected lifetime of the connection. The size of the connection state varies across different operating systems, depending on which TCP features are implemented. For example, FreeBSD 3.3 uses 288 bytes, whereas Linux 2.4 uses 340 bytes. In the illustrated examples, TCP connection state is assumed to require 512 bytes. This assumption is made for simplicity and future extensibility. Next, the rate at which connections arrive is the number of connections that should be supported. For example, the communication adapter may desire to support 10,000 connections per second. Finally, the expected lifetime of a connection is assumed to be 15,000 bytes for a typical transfer in these examples. This connection size requires 10 1,500 byte Ethernet packets. Assuming the connection begins with slow-start, 5 round-trip times (RTTs) are needed to build up the congestion window sufficiently to transfer all 10 packets. Assuming no loss and 100 msec RTTs, the expected connection lifetime is half a second. The total amount of state required is thus:

Normal Connection State=state per connection*connection rate*lifetime Normal Connection State=512 bytes*10000 connections/second*0.5=2,500,000 bytes To identify a buffer for transfer, communication adapter 300 is provided with a set of descriptors that include the physical system address and the length of the data object to be transferred and a "version" field for determining if this data (file mapping cache buffer) has been updated since the buffer has been initialized. These descriptors are received from server processes executed by a host processor on the host side of the data processing system. The data object is then pre-pended with the appropriate protocol headers and sent onto the high-bandwidth network through media access 308. In the case of a successful transmission, the data object is then "held" until a protocol acknowledgment is received. Otherwise, when a time out period is exceeded, the data object is held until the data object is successfully resent with an acknowledgment. Once an acknowledgment is received, the data object continues to be resident, depending on resource availability, in the hopes that the host requests another transfer using the same data buffer.

In all data transfer requests, the intelligent card will examine a lookup table of previously transferred addresses, offsets and version numbers. If these parameters match, communication adapter 300 may simply reuse the data object or objects without pulling this data from host memory. In these examples, the reference count incrementing and decrementing for the host memory buffer is performed to maintain synchronization for fail over capabilities. With a fail over capability or feature, if the adapter fails to successfully transmit a data object, the host can always retransmit the data object if necessary. The fail over feature also ensures that received data will not be lost by an adapter failure, since either the host will have the buffer or the remote end will be able to retransmit it. The communication adapter does not acknowledge received data until the data has been sent to the host, since the card may fail before the data transfer to the host occurs. If a retransmission of data is needed, client TCP options negotiated at connection establishment time can always be recovered from the host since the host is told about every connection established by the card.

To manage the network adapter buffers, the reuse function of these buffers uses a reference version count structure similar to the "virtual copy" mechanism of the host operating system. Since the transferring of data is simply a direct memory access (DMA) transfer of data and does not require any specialized locking of data from the cards point of view, the semantics of the transfer has not changed. Although, some interaction between the Host and Adapter Card is required to determine if the buffer is "free" or available for reuse, or "finished".

Figure 4:
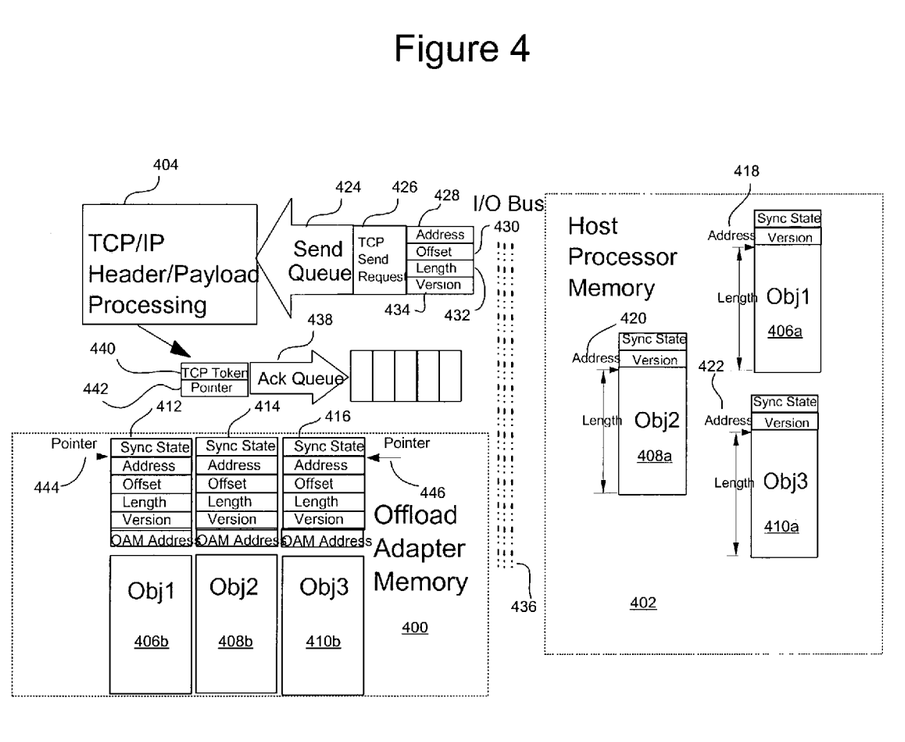
FIG. 4 is a block diagram illustrating components used in transferring data to a destination or target in accordance with a preferred embodiment of the present invention.

With reference now to FIG. 4, a block diagram illustrating components used in transferring data to a destination or target is depicted in accordance with a preferred embodiment of the present invention. In this example, offload adapter memory 400 may be implemented in communication adapter 300 as offload memory 312 in FIG. 3. Host processor memory 402 may be implemented as local memory 209 in data processing system 200 in FIG. 2. TCP/IP header/payload processing 404 may be executed by processor 304 in FIG. 3. In this example, data object 406a, 408a, and 410a are located in host processor memory 402, while data object 406b, 408b, and 410b are located in offload adapter memory 400. As used herein, a data object may be, for example, a graphical image, a text file, a program, a Web page, a spreadsheet, or an audio file. Further, a data object may be some combination of the preceding, depending on the particular implementation. Specifically, these objects are located in buffers 412, 414, and 416. Data Object 406b is a copy of data object 406a, data object 408b is a copy of data object 408a, and data object 410b is a copy of data object 410a. Each of these objects in host processor memory 402 has a length and is associated with a synchronization state and a version. Data object 406a is located at address 418, data object 408a is located at address 420, and data object 410a is located at address 422 in host processor memory 402. In offload adapter memory 400, each of the objects are stored in a buffer in offload adapter memory 400 in association with a synchronization state, an address, an offset, a length, a version, and an offload adapter memory (OAM) address. The synchronization state is a set of fields required to maintain correspondence between the adapter and host memory buffers. The address is the address of the corresponding object in host memory. This address is used to identify whether a data object within offload adapter memory 400 is present. The offset is used to support fragments or smaller objects within larger objects. The length parameter is the length of the data object. The version is an identifier used to inform the communication adapter of a situation in which a data object has been updated since a previous transfer. In this example, this identifier is a versioning number in the case that the data objects are shared with other host utilities or multiple communication adapters. This version identifier may be, for example, a boolean value if the data in host memory is exclusively used by a single communication adapter.

The offload adapter memory address is used to identify one or more offsets within shared objects. In this manner, smaller objects located within larger objects may be referenced using offset pointers. An object may be shared by having multiple pointer fields, such as pointers 444 and 446, that point to the same OAM address. The synchronization state field would contain information indicating that an object has been shared and a mechanism to coordinate the use and freeing of the object memory for reuse. For example, if object 406b contains three objects, offload memory adapter addresses may be used to reference these objects within object 406b. These smaller objects are also referred to as fragments.

A server process may place a request in send queue 424. This request is also referred to as a TCP send request, such as TCP send request 426. This request includes data descriptors, such as address 428, offset 430, length 432, and version 434. These data descriptors are used by TCP/IP header/payload processing 404 to determine whether a data object corresponding to these data descriptors are present in offload adapter memory 400. If a data object corresponding to these data objects is present, that data object is used for the transfer to the target. If a corresponding data object is absent in offload adapter memory 400, then the appropriate data object is transferred from host processor memory 402 to offload adapter memory 400 across I/O bus 436.

After the data is sent, acknowledgments are received in acknowledgment queue 438. Acknowledgment queue 438 contains a string of tuples containing TCP token and object information pointers. A tuple contains TCP token 440 and pointer 442 and is located within acknowledgment queue 438.

In receiving an acknowledgment, a token, such as TCP token 440 may be referenced from a received acknowledgment packet and placed into acknowledgment queue 438. This token is a field made up of socket connection information obtained from the received Ack packet. Pointer 442 is an object information pointer used to reference or point to active objects in memory. For example, pointer 442 may point to object 406b and its associated information, such as synchronization state, address, offset, length, version, and offload adapter memory address.

When an acknowledgment is received, the data buffer is released by updating the synchronization field associated with the buffer. The data object, however, remains in the data buffer for future data transfers. With respect to memory usage, objects may be selectively replaced or cleared from buffers when memory reaches a selected level of use. For example, buffers containing data objects that have been accessed the most recently may be ones retained, while others are released or cleared for use.

This mechanism does not limit fail over capabilities because data objects reside in both host processor memory 402 and offload adapter memory 400. This mechanism is also application independent, meaning that applications, such as server processes, may take advantage of this mechanism without modification.

Figure 5:
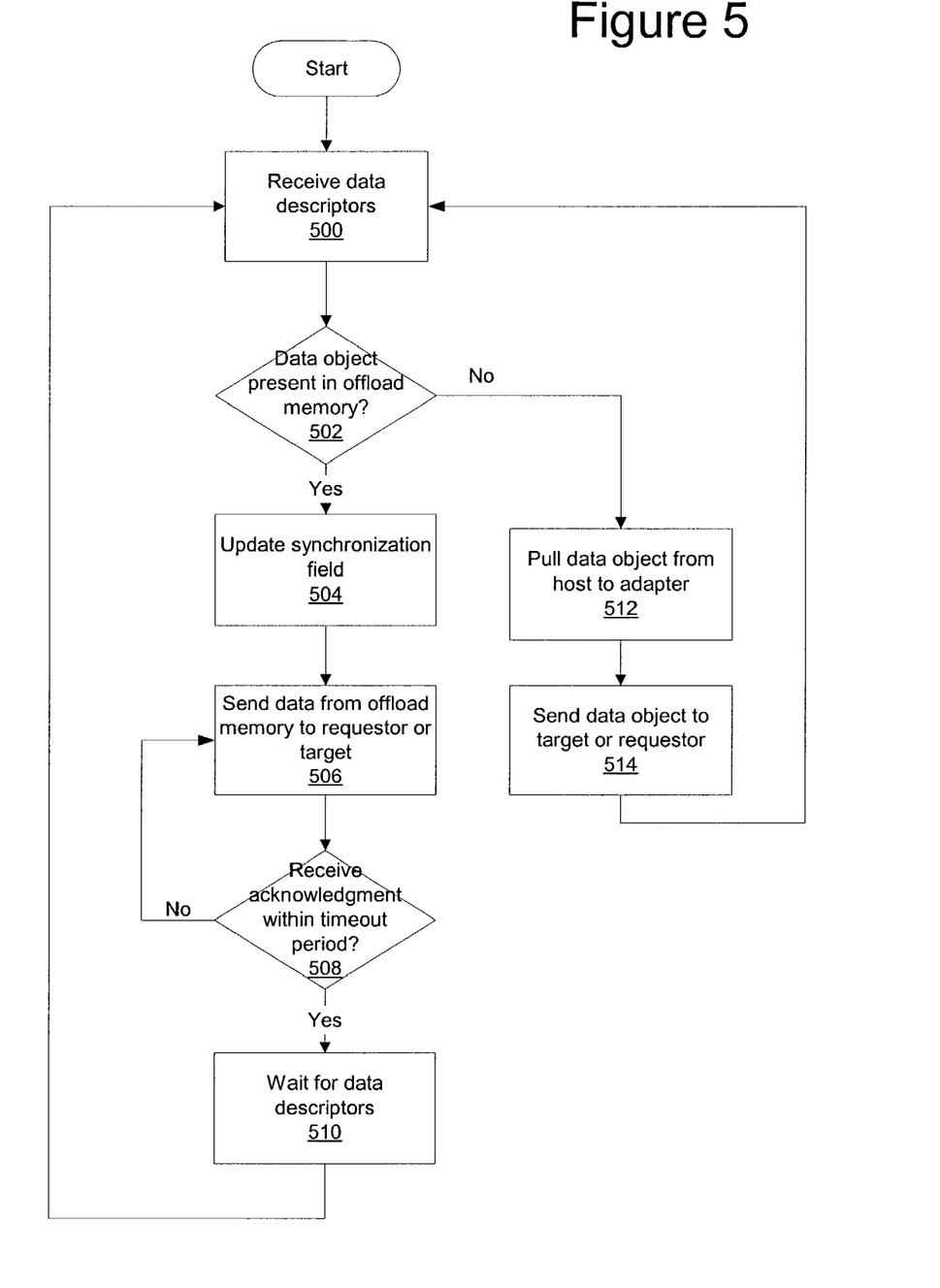
FIG. 5 is a flowchart of a process used for processing requests to transfer data in accordance with a preferred embodiment of the present invention.

Turning now to FIG. 5, a flowchart of a process used for processing requests to transfer data is depicted in accordance with a preferred embodiment of the present invention. The process illustrated in FIG. 5 may be implemented in a TCP/IP header/payload process, such as TCP/IP header/payload processing 404 in FIG. 4. In these examples, it is assumed that the communication adapter has at least TCP/IP offload capability where TCP/IP headers are to be added after data is transferred to the offload engine. This technique may be applied to existing systems where the TCP/IP stack is resident in the host when the header and data is transferred from separate buffers to the communication adapter.

The process begins by receiving data descriptors (step 500). In these examples, the data descriptors include an address, offset, length, and version. A determination is made as to whether a data object is present in the offload memory (step 502). This determination is made using the data descriptors to determine whether a data object corresponding to these data descriptors is present in a buffer in the offload memory.

If a data object is present in the offload memory, the synchronization field is updated (step 504). Data is sent from the offload memory to the requester or target (step 506). In these examples, the process on the communication adapter adds the appropriate protocol headers and then sends the data object on to the network for transfer to the requestor. Next, a determination is made as to whether an acknowledgment was received within the timeout period (step 508). If an acknowledgment was received within the timeout period, the process waits to receive additional data descriptors for processing (step 510) and the process returns to step 500 as described above when additional data descriptors are received.

With reference again to step 508, if an acknowledgment was not received within the timeout period, the process returns to step 506 as described above. This loop results in the data being resent to the requester. With reference again to step 502, if data is absent in the offload memory, the data object is pulled from the host to the adapter (step 512). The data object is sent to the target or requestor (step 514) and the process returns to step 500 as described above.

Figure 6:
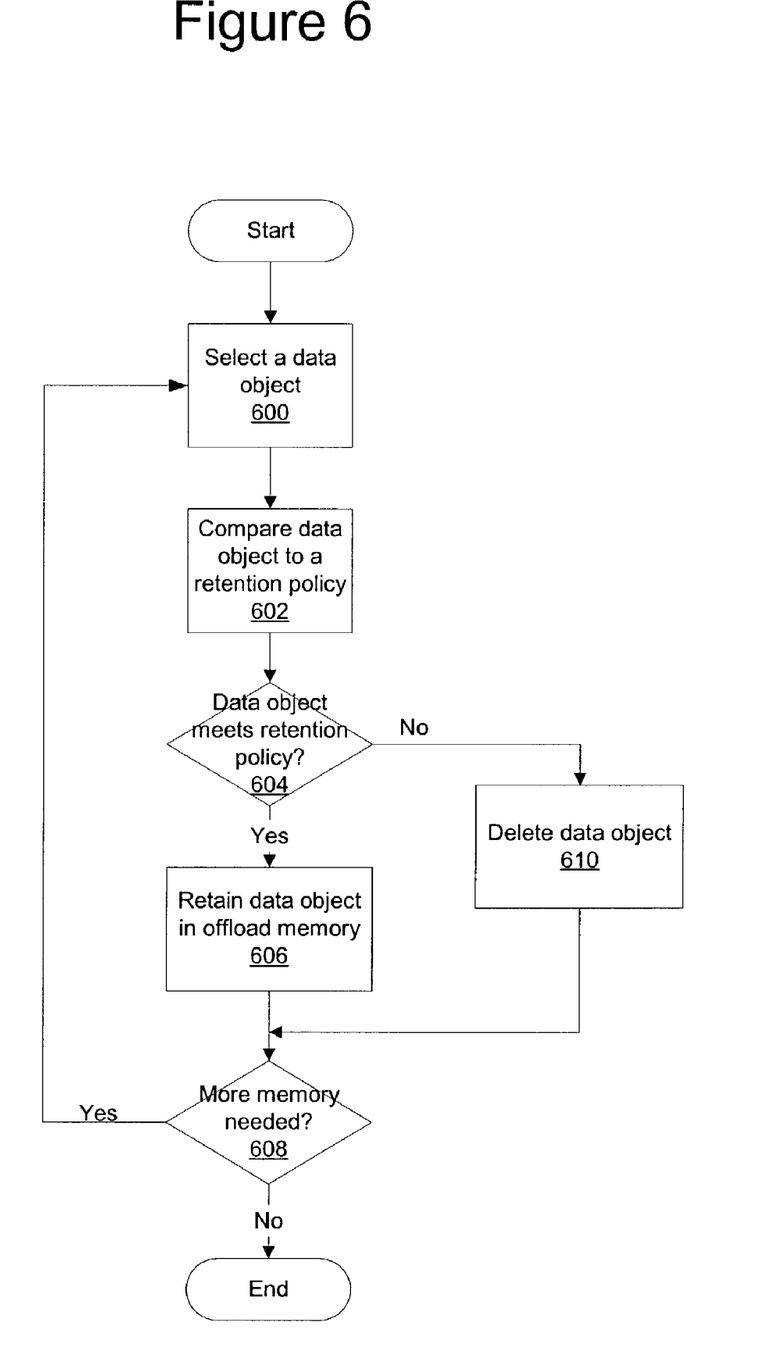
FIG. 6 is a flowchart of a process used for managing memory in a communication adapter in accordance with a preferred embodiment of the present invention.

With reference now to FIG. 6, a flowchart of a process used for managing memory in a communication adapter is depicted in accordance with a preferred embodiment of the present invention. The process illustrated in FIG. 6 may be implemented in a processor, such as processor 304 in FIG. 3.

The process begins by selecting a data object for processing (step 600). The data object is compared to a retention policy (step 602). The retention policy may vary depending on the particular implementation. For example, the number of times a data object has been sent and the times at which the data object was sent to a target may be used to identify data objects that have been most recently and most often used. With these factors, a threshold may be set for retaining or discarding data objects in a buffer in the offload memory. Another retention policy may be based on a first-in, first-out determination. Then, a determination is made as to whether the data object meets the retention policy (step 604). If the data object meets the retention policy, the data object is retained in the offload memory (step 606). Thereafter, a determination is made as to whether additional memory is needed (step 608). If additional memory is needed, the process returns to step 600 above. Otherwise, the process terminates. With reference again to step 604, if the data object does not meet the retention policy, the data object is deleted and the buffer is cleared or freed up for reuse (step 610) with the process then proceeding to step 608 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

Thus, the present invention provides an improved method, apparatus, and computer instructions for transferring data objects in a manner that minimizes traffic across busses in a data processing system and takes advantage of serving repetitively requested objects from offload memory. The mechanism of the present invention provides these and other advantages by sending TCP send requests to the communication adapter in which these requests do not include data. Instead, the request includes a descriptor of the data to be sent. The communication adapter pulls the data only when the data cannot be found in offload memory. In this manner, the traffic across the bus systems connecting the communication adapter to the host are reduced. Bottlenecks in the bus systems are avoided, resulting in increased performance in responding to requests for data.

As an additional benefit, the buffers used to cache data objects in the communication adapter can be used for "shared" retransmission buffers. This usage results in reduced bandwidth on the I/O bus and the reduction of memory utilization for transmit buffers on the card. These buffers are data buffers that are held while waiting for return Ack messages when data is sent with a reliable protocol, such as TCP/IP. The data is held in the unlikely event that the Ack times out and the data is to be resent. The mechanism of the present invention also may be applied to other fields such as, for example, storage area networks, where the memory cache is at the edge of the I/O network.

The description of the present invention has been presented for purposes of illustration and description, and is not intended to be exhaustive or limited to the invention in the form disclosed. Many modifications and variations will be apparent to those of ordinary skill in the art. Although the illustrated embodiment is directed towards transmission of data, the mechanism of the present invention may be applied to the receipt of data as well. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transferring data objects, the method comprising the data processing system implemented steps of:
   receiving a request for a data object at a communication adapter;
   responsive to receiving the request, determining whether the data object is stored in a memory in the communication adapter;
   responsive to the data object being present in the memory, transferring the data object from the memory to a receiver of the data object through the communication adapter, wherein transfer of the data across a bus connecting the communication adapter to a host processing unit is unnecessary;
   wherein the receiving, determining, and transferring steps are implemented in the communication adapter.

2. The method of claim 1 further comprising:
   responsive to the data-object-being absent in the memory, transferring the data object across the bus from a storage device to the memory;
   transferring the data object from the memory to the receiver through the communication adapter; and
   retaining the data object in the memory for use in responding to subsequent requests for the data object.

3. The method of claim 1 further comprising:
   responsive to the data object being absent in the memory, transferring the data object across the bus from a storage device to the memory;
   transferring the data object from the memory to the receiver through the communication adapter;
   determining whether to retain the data object in the memory after receiving an acknowledgment of receipt of the data object by the receiver; and
   responsive to a determination that the data object is to be retained, retaining the data object in the memory for use in responding to subsequent requests for the data object.

4. The method of claim 1 further comprising:
   responsive to the data object being present in the memory, determining whether the data object in the memory is valid;
   responsive to the data object in the memory being invalid, transferring a valid copy of the data object across the bus from a storage device to the memory; and
   transferring the valid copy of the data object from the memory to the receiver through the communication adapter.

5. The method of claim 1, wherein the host processing unit is a Web server.

6. The method of claim 1, wherein the data object is at least one of a Web page, an image, a text file, an audio file, and a program.

7. The method of claim 1, wherein the request is a data transfer request generated by the host processing unit in response to receiving an initial request from the receiver.

8. The method of claim 5, wherein the data transfer request includes data descriptors for the data object.

9. The method of claim 1, further comprising:
   responsive to the data object being present in the memory, comparing a first versioning identifier associated with the data object to a second versioning identifier; and
   responsive to an absence of a match between the first versioning identifier and the second versioning identifier, transferring a new version of the data object across the bus from a storage device to the memory.

10. The method of claim 1, wherein the data object contains a set of fragments, which may be referenced using an offset.

11. A data processing system for transferring data objects, the data processing system comprising:
    a bus system;
    a memory connected to the bus system, wherein the memory includes a set of instructions;
    a host processing unit connected to the bus system; and
    a communications unit connected to the bus system, wherein the communications unit executes the set of instructions to receive a request for a data object at a communication adapter; determine whether the data object is stored in a memory in the communication adapter in response to receiving the request; and transfer the data object from the memory in the communication adapter to a receiver of the data object through the communication adapter, in which transfer of the data across a bus connecting the communication adapter to the host processing unit is unnecessary in response to the data object being present in the memory in the communication adapter.

12. A data processing system for transferring data objects, the data processing system comprising:
    receiving means for receiving a request for a data object at a communication adapter;
    determining means, responsive to receiving the request, for determining whether the data object is stored in a memory in the communication adapter;
    transferring means, responsive to the data object being present in the memory, for transferring the data object from the memory to a receiver of the data object trough the communication adapter, wherein transfer of the data across a bus connecting the communication adapter to a host processing unit is unnecessary;
    wherein the receiving, determining, and transferring means are implemented in the communication adapter.

13. The data processing system of claim 12, wherein the transferring means is a first transferring means and further comprising:
    second transferring means, responsive to the data object being absent in the memory, for transferring the data object across the bus from a storage device to the memory;
    third transferring means for transferring the data object from the memory to the receiver through the communication adapter; and
    retaining means for retaining the data object in the memory for use in responding to subsequent requests for the data object.

14. The data processing system of claim 12, wherein the transferring means is a first transferring means, the determining means is a first determining means, and further comprising:
    fourth transferring means, responsive to the data object being absent in the memory, for transferring the data object across the bus from a storage device to the memory;
    fifth transferring means for transferring the data object from the memory to the receiver through the communication adapter;

second determining means for determining whether to retain the data object in the memory after receiving an acknowledgment of receipt of the data object by the receiver; and retaining means, retaining responsive to a determination that the data object is to be retained, for retaining the data object in the memory for use in responding to subsequent requests for the data object.

15. The data processing system of claim 12, wherein the determining means is a first determining means, the transferring means is a first transferring means, and further comprising:

third determining means, responsive to the data object being present in the memory, for determining whether the data object in the memory is valid;

sixth transferring means, responsive to the data object in the memory being invalid, for transferring a valid copy of the data object across the bus from a storage device to the memory; and seventh transferring means for transferring the valid copy of the data object from the memory to the receiver through the communication adapter.

16. The data processing system of claim 12, wherein the host processing unit is a Web server.

17. The data processing system of claim 16, wherein the data transfer request includes data descriptors for the data object.

18. The data processing system of claim 12, wherein the data object is at least one of a Web page, an image, a text file, an audio file, and a program.

19. The data processing system of claim 12, wherein the request is a data transfer request generated by the host processing unit in response to receiving an initial request from the receiver.

20. The data processing system of claim 12, wherein the transferring means is a first transferring means and further comprising:

comparing means, responsive to the data object being present in the memory, for comparing a first versioning identifier associated with the data object to a second versioning identifier; and eighth transferring means, responsive to an absence of a match between the first versioning identifier and the second versioning identifier, for transferring a new version of the data object across the bus from a storage device to the memory.

21. The data processing system of claim 12, wherein the data object contains a set of fragments, which may be referenced using an offset.

22. A computer program product in a computer readable medium for transferring data objects, the computer program product comprising:

first instructions for receiving a request for a data object at a communication adapter;

second instructions, responsive to receiving the request, for determining whether the data object is stored in a memory in the communication adapter;

third instructions, responsive to the data object being present in the memory, for transferring the data object from the memory to a receiver of the data object through the communication adapter, wherein transfer of the data across a bus connecting the communication adapter to a host processing unit is unnecessary;

wherein the first, second, and third instructions are implemented in the communication adapter.

* * * * *

UNITED STATES PATENT AND TRADEMARK OFFICE
CERTIFICATE OF CORRECTION

PATENT NO. : 6,968,358 B2
DATED : November 22, 2005
INVENTOR(S) : Freimuth et al.

It is certified that error appears in the above-identified patent and that said Letters Patent is hereby corrected as shown below:

Column 11,
Line 24, after "to the" delete "data-object-being" and insert -- data object being --.

Column 12,
Line 36, after "object" delete "trough" and insert -- through --.

Signed and Sealed this

Fourteenth Day of March, 2006

JON W. DUDAS
*Director of the United States Patent and Trademark Office*